United States Patent
Parthasarathy et al.

(10) Patent No.: US 11,693,714 B2
(45) Date of Patent: Jul. 4, 2023

(54) SYSTEM AND METHOD FOR FACILITATING MANAGEMENT OF CLOUD INFRASTRUCTURE BY USING SMART BOTS

(71) Applicant: MONTYCLOUD INC, Redmond, WA (US)

(72) Inventors: Kannan Parthasarathy, Redmond, WA (US); Venkatanathan Krishnamachari, Woodinville, WA (US); Sumant Dubey, Bangalore (IN); Muhammed Basil S K, Calicut (IN); Varsha Mallya, Bangalore (IN); Ritu Periwal, Bangalore (IN); Padalingam Agasthian, Tirunelveli (IN); Srimathi Santhanam, Redmond, WA (US)

(73) Assignee: MONTYCLOUD INC, Redmond, WA (US)

(*) Notice: Subject to any disclaimer, the term of this patent is extended or adjusted under 35 U.S.C. 154(b) by 0 days.

(21) Appl. No.: 17/563,117

(22) Filed: Dec. 28, 2021

(65) Prior Publication Data

US 2022/0206867 A1 Jun. 30, 2022

Related U.S. Application Data

(60) Provisional application No. 63/130,956, filed on Dec. 28, 2020.

(51) Int. Cl.
*G06F 9/50* (2006.01)
*G06N 5/025* (2023.01)
*G06F 11/34* (2006.01)

(52) U.S. Cl.
CPC .......... *G06F 9/5072* (2013.01); *G06F 9/5077* (2013.01); *G06F 11/3409* (2013.01); *G06F 11/3438* (2013.01); *G06N 5/025* (2013.01)

(58) Field of Classification Search
CPC .. G06F 9/5072; G06F 9/5077; G06F 11/3409; G06F 11/3438; G06F 9/4843; G06F 2209/508; G06N 5/025
See application file for complete search history.

(56) References Cited

U.S. PATENT DOCUMENTS 10,705,948 B2 7/2020 Ramasamy et al.
10,735,522 B1 8/2020 Sathianarayanan et al.
(Continued)

FOREIGN PATENT DOCUMENTS

CN 105897509 B 4/2020
WO WO-2018208472 A1 * 11/2018 .......... G06F 11/3006

*Primary Examiner* — Michael A Keller
(74) *Attorney, Agent, or Firm* — Jason C. Cameron

(57) ABSTRACT

A system and method for facilitating management of cloud infrastructure by using smart bots is disclosed. The method includes obtaining one or more insights associated with one or more user accounts on a cloud infrastructure from one or more cloud infrastructure resources and determining one or more cloud infrastructure issues associated with the one or more user accounts by validating the obtained one or more insights based on a set of predefined rules. The method further includes creating one or more customized bots for the determined one or more cloud infrastructure issues based on one or more user parameters by using a rule engine based AI model and deploying the created one or more customized bots on the one or more cloud infrastructure resources. Further, the method includes managing the cloud infrastructure via the deployed one or more customized bots.

24 Claims, 7 Drawing Sheets

(56) References Cited

U.S. PATENT DOCUMENTS

| | | | |
|---|---|---|---|
| 2019/0155225 A1* | 5/2019 | Kothandaraman | G05B 13/041 |
| 2020/0342032 A1* | 10/2020 | Subramaniam | G10L 15/063 |
| 2020/0348960 A1 | 11/2020 | Krishnamurthy et al. | |
| 2022/0138081 A1* | 5/2022 | Varma | H04L 43/50 717/124 |

* cited by examiner

SYSTEM AND METHOD FOR FACILITATING MANAGEMENT OF CLOUD INFRASTRUCTURE BY USING SMART BOTS

EARLIEST PRIORITY DATE

This application claims priority from a Provisional patent application filed in the United States of America having Patent Application No. 63/130,956, filed on Dec. 28, 2020, and titled "SYSTEM AND METHOD TO COMPOSE AND MANAGE BOTS ON CLOUD INFRASTRUCTURE".

FIELD OF INVENTION

Embodiments of the present disclosure relate to the field of cloud infrastructure and more particularly relates to a system and a method for facilitating management of cloud infrastructure by using smart bots.

BACKGROUND

Generally, multiple organizations use both automated and manual tools to manage, monitor and evaluate their cloud architecture. The manual tools are used by an administrator of an organization to monitor status of cloud-based resources by incorporating an overall management strategy. Further, the administrators identify emerging defects and troubling patterns associated with the cloud-based resources based on status monitoring of the cloud-based resources. The status monitoring may also be performed by using automated bots. The organizations may deploy the automated bots in boundary, such as customer accounts to monitor cloud infrastructures of the organizations. However, the conventional automated bots fail to perform automated actions for managing the cloud infrastructure. Therefore, one or more users of the conventional automated bots have to perform the actions manually, to manage the cloud infrastructure. Furthermore, the conventional automated bots don't meet customized solutions required by an organization. For example, an automated bot required by a tech organization may be different from the automated bot required by a health safety organization. The automated bot associated with the tech organization may use Service Organization Controls (SoC) compliance for cloud infrastructure management and the automated bot associated with the health safety organization may use Health Insurance Portability and Accountability Act (HIPAA) compliance for cloud infrastructure management. Thus, the conventional automated bots are not accurate and efficient in terms of managing the cloud infrastructure of the organization.

Hence, there is a need for an improved system and method for facilitating management of cloud infrastructure by using smart bots, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a cloud management platform for facilitating management of cloud infrastructure by using smart bots is disclosed. The cloud management platform includes a plurality of virtual cloud appliances and a memory coupled to the plurality of virtual cloud appliances. The memory includes a plurality of modules in the form of programmable instructions executable by the plurality of virtual cloud appliances. The plurality of modules include a data obtaining module configured to obtain one or more insights associated with one or more user accounts of one or more users on a cloud infrastructure from one or more cloud computing devices. The plurality of modules also include a data validation module configured to determine one or more cloud infrastructure issues associated with the one or more user accounts by validating the obtained one or more insights based on a set of predefined rules. The plurality of modules include a bot creation module configured to create one or more customized bots for the determined one or more cloud infrastructure issues based on one or more user parameters by using a rule engine based Artificial Intelligence (AI) model. Further, the plurality of modules include a bot deploying module configured to deploy the created one or more customized bots on the one or more cloud computing devices. The plurality of modules include a data management module configured to manage the cloud infrastructure via the deployed one or more customized bots.

In accordance with another embodiment of the present disclosure, a method for facilitating management of cloud infrastructure by using smart bots is disclosed. The method includes obtaining one or more insights associated with one or more user accounts of one or more users on a cloud infrastructure from one or more cloud computing devices. The method also includes determining one or more cloud infrastructure issues associated with the one or more user accounts by validating the obtained one or more insights based on a set of predefined rules. The method further includes creating one or more customized bots for the determined one or more cloud infrastructure issues based on one or more user parameters by using a rule engine based Artificial Intelligence (AI) model. Further, the method includes deploying the created one or more customized bots on the one or more cloud computing devices. The method includes managing the cloud infrastructure via the deployed one or more customized bots.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
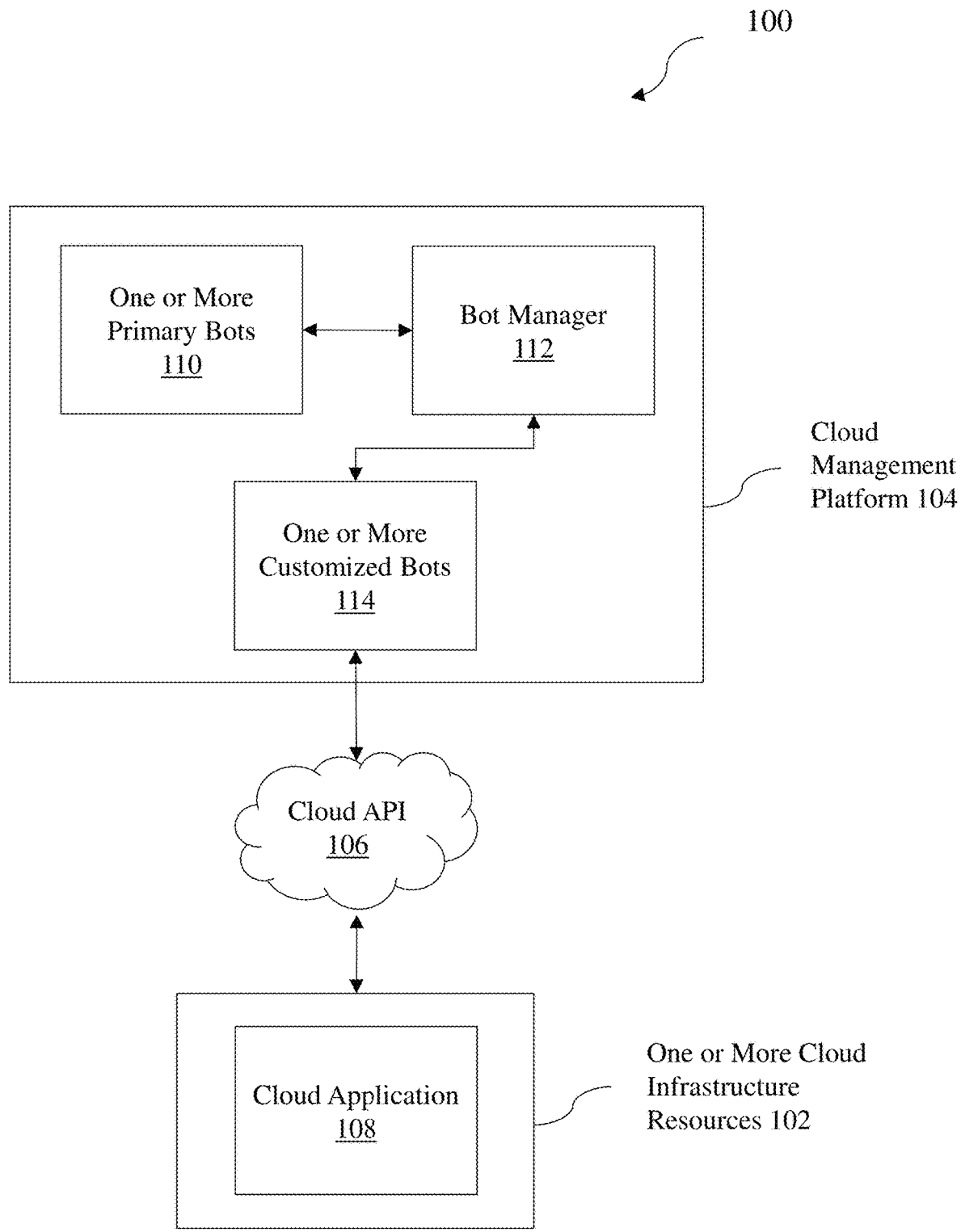
FIG. 1 is a block diagram illustrating an exemplary computing environment for facilitating management of cloud infrastructure by using smart bots, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for facilitating management of cloud infrastructure by using smart bots, in accordance with an embodiment of the present disclosure. The computing environment 100 includes one or more cloud infrastructure resources 102 communicatively coupled to a cloud management platform 104 via a cloud Application Programming Interface (API) 106. The one or more cloud infrastructure resources 102 are used by one or more users for providing information associated with one or more security events and one or more compliance events corresponding to one or more user accounts to the cloud management platform 104. In an exemplary embodiment of the present disclosure, the one or more cloud infrastructure resources 102 may include one or more cloud computing devices. Details on the one or more security events and the one or more compliance events have been elaborated in subsequent paragraphs of the present description. In an exemplary embodiment of the present disclosure, the one or more cloud computing devices may include Central Processing Unit (vCPU), Graphical Processing Unit (GPU), virtual network devices or interfaces attached to virtual or physical storage devices and the like. The cloud management platform 104 may be hosted on a single computing server or on a distributed network of cloud servers, such as virtual machines, containers and the like, central server, such as cloud server or a remote server.

Further, the cloud management platform 104 includes one or more primary bots 110, as shown in FIG. 1. The one or more primary bots are deployed on the one or more cloud infrastructure resources 102. In an exemplary embodiment of the present disclosure, the one or primary bots include one or more security bots, one or more compliance bots and the like. The one or more primary bots 110 associated with the cloud management platform 104 dynamically listen and fetch one or more events associated with the one or more user accounts from one or more sources. In an embodiment of the present disclosure, the one or more primary bots 110 associated with the cloud management platform 104 receives the one or more events as a stream or a batch. In an exemplary embodiment of the present disclosure, the one or more events includes the one or more security events, the one or more compliance events and the like. Furthermore, the one or more primary bots 110 associated with the cloud management platform 104 generates one or more insights associated with the one or more user accounts on the cloud infrastructure based on the fetched one or more events by using a rule engine based Artificial Intelligence (AI) model. In an exemplary embodiment of the present disclosure, the one or more insights include one or more security insights, one or more compliance insights and the like. In an embodiment of the present disclosure, one or more primary bots autonomously plugs into an events stream from the one or more user accounts and obtains the one or more insights 208. The one or more primary bots operate outside of the cloud management platform in the one or more user accounts based on smart rules. In an embodiment of the present disclosure, the one or more primary bots may filter noise from signals associated with the one or more insights 208 by analyzing the event stream in its deployed environment.

Furthermore, the cloud management platform 104 includes a bot manager 112, as shown in FIG. 1. The bot manager 112 creates the one or more customized bots 114 for the one or more insights based on one or more user parameters by using the rule engine based AI model. The one or more customized bots 114 are deployed on the one or more cloud infrastructure resources 102 for managing the cloud infrastructure. Details on the bot manager 112 have been elaborated in subsequent paragraphs of the present description with reference to FIG. 2B.

In an embodiment of the present disclosure, the one or more cloud infrastructure resources 102 hosting the cloud application 108 may be accessed by a local browser, a mobile application or a combination thereof. The one or more users may use a web application via the local browser, the mobile application or a combination thereof to communicate with the cloud management platform 104. In an embodiment of the present disclosure, the cloud management platform 104 includes a plurality of modules. Details on the plurality of modules have been elaborated in subsequent paragraphs of the present description with reference to FIG. 3.

Further, the cloud management platform 104 obtains the one or more insights associated with the one or more user accounts of the one or more users on the cloud infrastructure from the one or more cloud infrastructure resources 102. The cloud management platform 104 determines one or more cloud infrastructure issues associated with the one or more user accounts by validating the obtained one or more insights based on a set of predefined rules. The cloud management platform 104 also creates the one or more customized bots 114 for the determined one or more cloud infrastructure issues based on the one or more user parameters by using the rule-engine based AI model. Furthermore, the cloud management platform 104 deploys the created one or more customized bots 114 on the one or more cloud infrastructure resources 102. The cloud management platform 104 manages the cloud infrastructure via the deployed one or more customized bots 114.

Figure 2A:
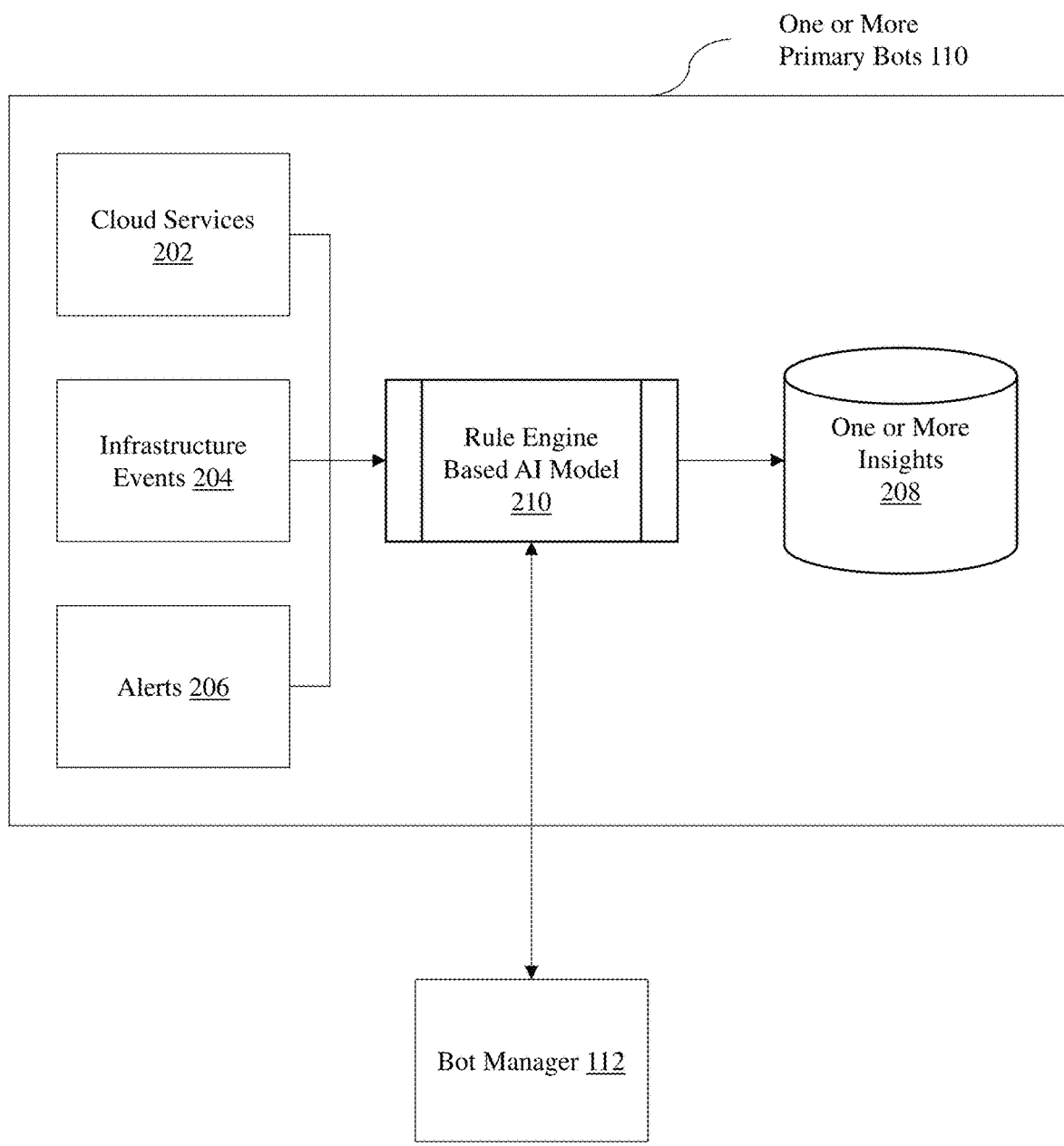
FIGS. 2A-2B are exemplary block diagrams illustrating interactions between one or more primary bots and bot manager, in accordance with an embodiment of the present disclosure.
Figure 2B:
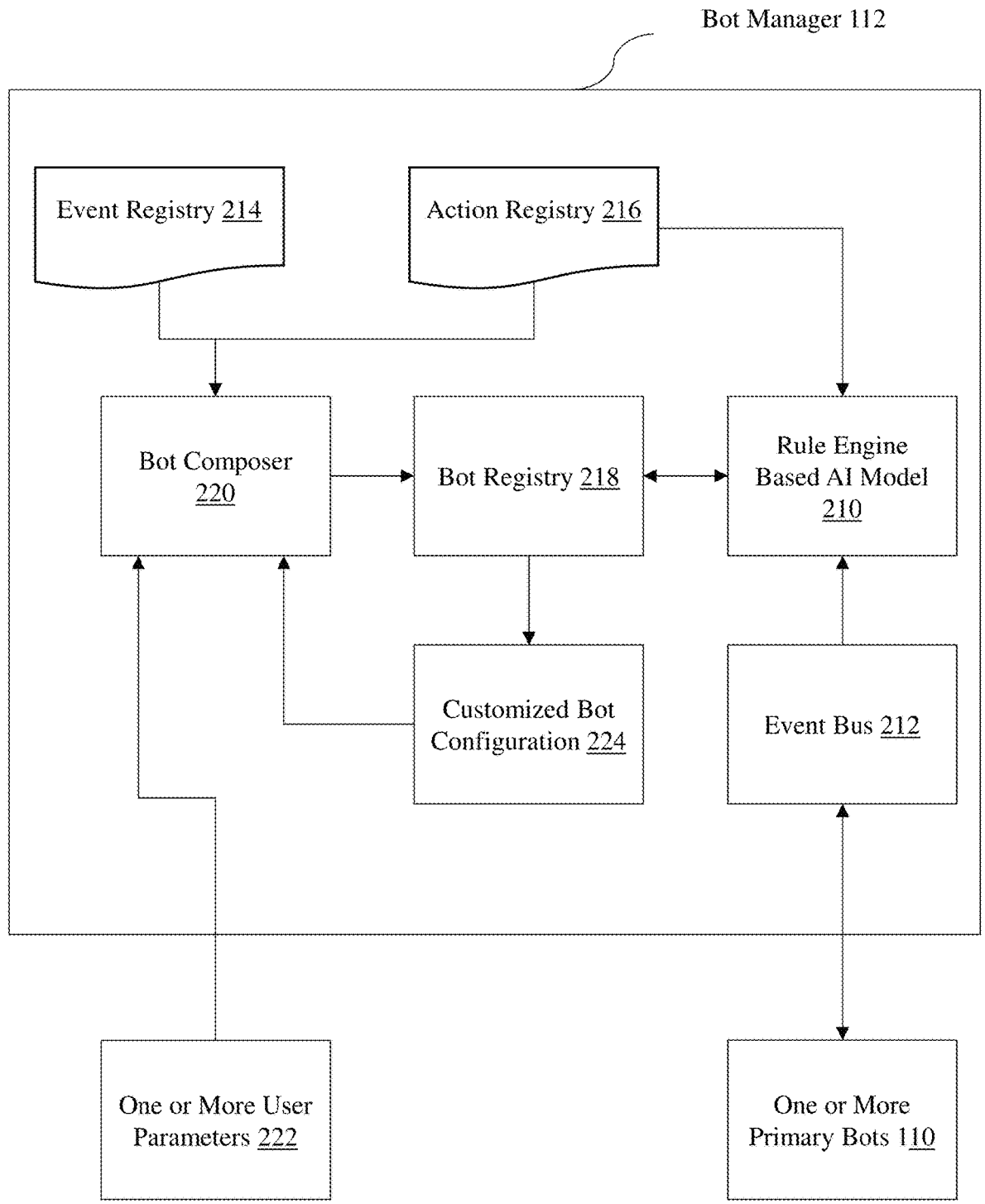

FIGS. 2A-2B are exemplary block diagrams illustrating interactions between one or more primary bots 110 and bot manager 112, in accordance with an embodiment of the present disclosure. The one or more primary bots 110 associated with the cloud management platform 104 dynamically fetch the one or more events associated with the one or more user accounts from the one or more sources. In an exemplary embodiment of the present disclosure, the one or more resources include cloud services 202, infrastructure events 204, alerts 206 or a combination thereof, as shown in FIG. 2A. Furthermore, the one or more primary bots 110 associated with the cloud management platform 104 generates the one or more insights 208 associated with the one or more user accounts on the cloud infrastructure based on the fetched one or more events by using the rule engine based AI model 210. In an embodiment of the present disclosure, the one or more primary bots 110 may also determine one or more actions, such as one or more security actions and one or more compliance actions to manage the cloud infrastructure. Details on the one or more security actions and the one or more compliance actions have been elaborated in subsequent paragraphs of the present description with reference to FIG. 3. Further, the one or more insights 208 along with the one or more events are transmitted to the bot manager 112, as shown in FIG. 2A and FIG. 2B.

Further, the bot manager 112 includes an event bus 212, as shown in FIG. 2B. The event bus 212 receives the one or more insights 208 from the one or more primary bots 110. The bot manager 112 also includes an event registry 214, an action registry 216 and a bot registry 218. In an embodiment of the present disclosure, the event registry 214 includes the one or more events associated with the one or more user accounts. In an exemplary embodiment of the present disclosure, the one or more events include the one or more security events and the one or more compliance events associated with the one or more user accounts. Furthermore, the action registry 216 includes the set of predefined rules for validating the one or more insights 208. The bot registry 218 includes one or more bot parameters. The one or more bot parameters include bot states, bot types, bot instances, launch scope of the bot instances and bot management functionalities corresponding to a plurality of customized bots that are created, composed or a combination thereof by the bot manager 112. In an exemplary of the present disclosure, the bot management functionalities include change configuration, control lifecycle, monitor bot insights and the like associated with the plurality of customized bots. The bot manager 112 includes a bot composer 220, as shown in FIG. 2B. The bot composer 220 receives the one or more user parameters 222 from the one or more users. In an exemplary embodiment of the present disclosure, the one or more user parameters 222 include type of the one or more users, configuration of the one or more cloud infrastructure resources 102, type of the cloud infrastructure associated with the one or more users and the like. Further, the bot composer 220 creates a customized bot configuration 224 for the cloud infrastructure based on the one or more user parameters 222, the validated one or more insights 208, the determined one or more cloud infrastructure issues, the one or more events and the one or more bot parameters by using the rule engine based AI model 210. The bot composer 220 creates the one or more customized bots 114 based on the generated bot configuration by using the rule engine based AI model 210. The created one or more customized bots 114 are deployed on the one or more cloud infrastructure resources 102 in the one or more user accounts via the cloud API 106 for managing the cloud infrastructure. In an embodiment of the present disclosure, the bot manager 112 may also determine the one or more actions for resolving one or more security issues and one or more compliance violations to manage the cloud infrastructure. Details on the one or more security issues and the one or more compliance violations have been elaborated in subsequent paragraphs of the present description with reference to FIG. 3.

Figure 3:
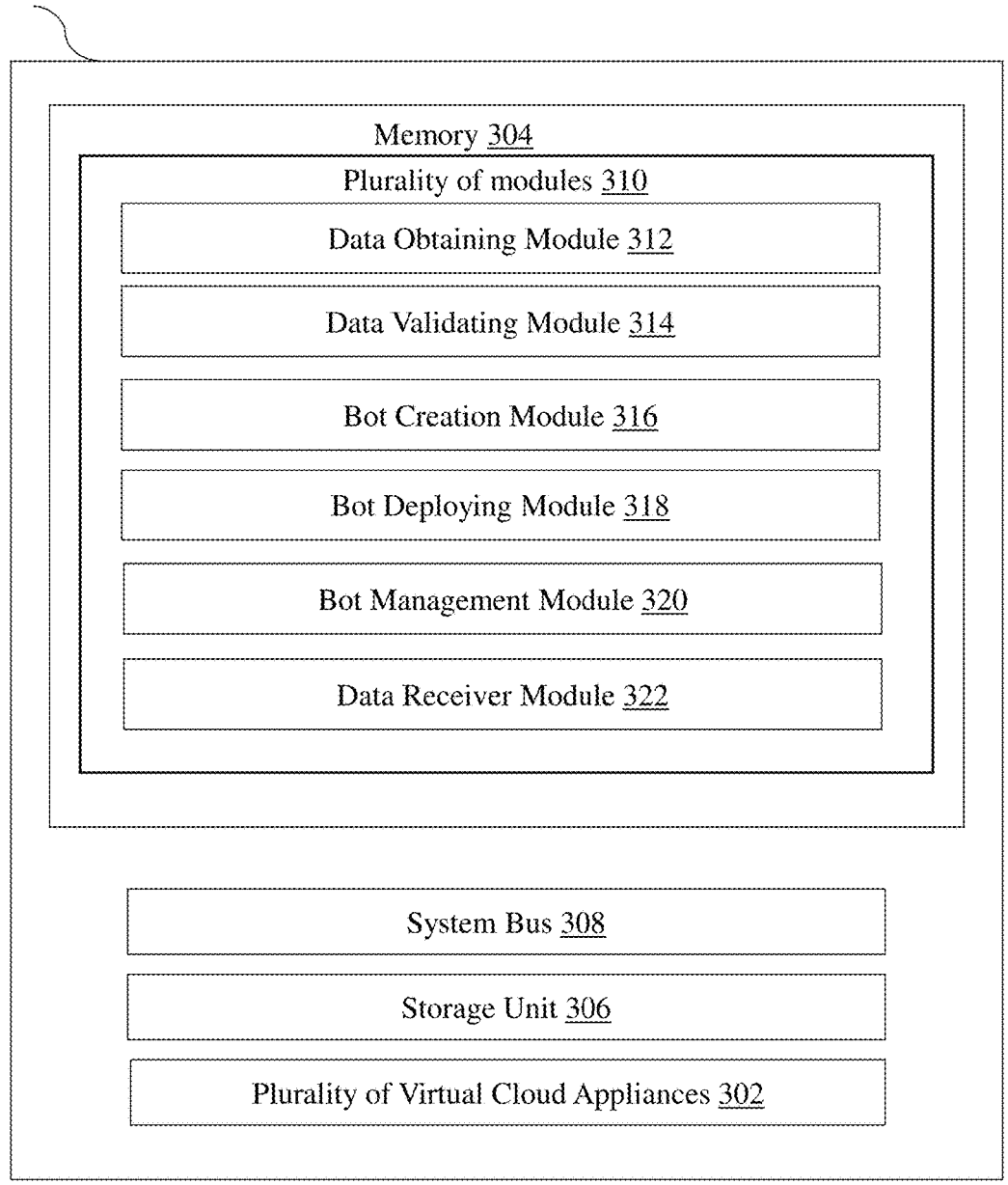
FIG. 3 is a block diagram illustrating an exemplary cloud management platform for facilitating management of the cloud infrastructure by using the smart bots, in accordance with an embodiment of the present disclosure.

FIG. 3 is a block diagram illustrating an exemplary cloud management platform 104 for facilitating management of the cloud infrastructure by using the smart bots, in accordance with an embodiment of the present disclosure. In an embodiment of the present disclosure, the cloud management platform 104 corresponds to a Software as a Service (SaaS) platform. The cloud management platform 104 includes programmable instructions deployed on a plurality of virtual cloud appliances 302, configurations associated with the programmable instructions, a memory 304 coupled to the plurality of virtual cloud appliances 302 and a storage unit 306. The plurality of virtual cloud appliances 302, the memory 304 and the storage unit 306 are communicatively coupled through a system bus 308 or any similar mechanism. The memory 304 comprises the plurality of modules 310 in the form of programmable instructions executable by the plurality of virtual cloud appliances 302. Further, the plurality of modules 310 includes a data obtaining module 312, a data validation module 314, a bot creation module 316, a bot deploying module 318, a data management module 320 and a data receiver module 320.

In an embodiment of the present disclosure, the plurality of virtual cloud appliances 302 may include virtual Central Processing Unit (vCPU), Graphical Processing Unit (GPU) and other processors. In another embodiment of the present disclosure, the plurality of virtual cloud appliances 302, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The plurality of virtual cloud appliances 302 may also include embedded controllers, such as generic or programmable logic devices or arrays, application specific integrated circuits, single-chip computers, and the like.

The memory 304 may be non-transitory volatile memory and non-volatile memory. The memory 304 may be coupled for communication with the plurality of virtual cloud appliances 302, such as being a computer-readable storage medium. The plurality of virtual cloud appliances 302 may execute machine-readable instructions and/or source code stored in the memory 304. A variety of machine-readable instructions may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 304 includes the plurality of modules 310 stored in the form of machine-readable instructions on any of the above-mentioned storage media and may be in communication with and executed by the plurality of virtual cloud appliances 302.

The storage unit 306 may be a cloud storage or a local file directory within a remote server. The storage unit 306 may store the event registry 214 including the one or more events, the action registry 216 including the predefined set of rules and the bot registry 218 including the one or more bot parameters. The storage unit 306 may also store the one or more user parameters 222, the one or more insights 208, the customized bot configuration 224, predefined security information and pre-configured compliance rules.

The data obtaining module 312 is configured to obtain the one or more insights 208 associated with the one or more user accounts of the one or more users on the cloud infrastructure from the one or more cloud infrastructure resources 102. In an exemplary embodiment of the present disclosure, the one or more cloud infrastructure resources 102 may include one or more cloud computing devices. In an exemplary embodiment of the present disclosure, the one or more cloud computing devices may include Central Processing Unit (vCPU), Graphical Processing Unit (GPU), virtual network devices or interfaces attached to virtual or physical storage devices and the like. Further, the one or more insights 208 may include the one or more security insights, the one or more compliance insights and the like. In an embodiment of the present disclosure, the one or more insights 208 associated with the one or more user accounts are obtained through the one or more primary bots 110. In an exemplary embodiment of the present disclosure, the one or more primary bots 110 include the one or more security bots, the one or more compliance bots and the like. In an embodiment of the present disclosure, the one or more primary bots 110 are autonomous and intelligent software entities which may be deployed in one or more boundaries, such as organization, department, application, cloud account/subscription, region and the like. In another embodiment of the present disclosure, the one or more primary bots 110 are lambda function configured to receive events to monitor the one or more user accounts. The one or more primary bots 110 may not be associated with the one or more cloud infrastructure resources 102. In obtaining the one or more insights associated with one or more user accounts of the one or more users on the cloud infrastructure from the one or more cloud infrastructure resources 102, the data obtaining module 312 monitors the one or more user accounts associated with the one or more users by using the one or more primary bots 110. Further, the data obtaining module 312 obtains the one or more insights associated with the one or more user accounts based on result of monitoring by using the rule engine based AI model via the one or more primary bots 110.

Further, when the one or more primary bots 110 are the one or more security bots, in obtaining the one or more insights 208 associated with the one or more user accounts of the one or more users on the cloud infrastructure from the one or more cloud infrastructure resources 102, the data obtaining module 312 dynamically fetches the one or more security events associated with the one or more user accounts from the one or more sources through the one or more security bots by continuously monitoring one or more security aspects of the one or more user accounts. In an exemplary embodiment of the present disclosure, the one or more security aspects include relevant events, configuration changes, API trail activities within the one or more user accounts and the like. In an exemplary embodiment of the present disclosure, the one or more sources include cloud services 202, infrastructure events 204, alerts 206 or a combination thereof. The data obtaining module 312 generates the one or more security insights associated with the one or more user accounts on the cloud infrastructure based on the fetched one or more security events by using the rule engine based AI model 210 via the one or more security bots. For example, the one or more security events may include a high severity security event. The high severity security event is generated when an Amazon Web Service (AWS) security group is detected to have unrestricted access on all ports and protocols. The one or more insights corresponding to the high severity security event may include details of concerned resource including resource Id and type, and other details like risk associated with the high severity security event, such as severity, status, reported date, time and the like. In another example, the one or more security events may include a critical severity security event. The critical severity security event is generated when an AWS EC2 instance is detected to be not protected by AWS Backup. The one or more insights corresponding to the critical severity security event may include EC2 resource id along with the severity and other related events. Furthermore, when the one or more primary bots 110 are the one or more compliance bots, in obtaining the one or more insights 208 associated with the one or more user accounts of the one or more users on the cloud infrastructure from the one or more cloud infrastructure resources 102, the data obtaining module 312 dynamically fetches the one or more compliance events associated with the one or more user accounts from the one or more sources through the one or more compliance bots by continuously monitoring one or more compliance aspects of the one or more user accounts. In an exemplary embodiment of the present disclosure, the one or more compliance aspects include configuration, changes to infrastructure in the one or more user accounts and the like. The data obtaining module 312 generates the one or more compliance insights associated with the one or more user accounts on the cloud infrastructure based on the fetched one or more compliance events by using the rule engine based AI model 210 via the one or more compliance bots. For example, a compliance event may be raised when all Simple Storage Service (S3) Buckets in an AWS account are required to have Server Side Encryption enabled as per policy and one of the S3 Buckets encryption state changes. When one of the S3 Buckets encryption state changes to enabled, the compliance event may be raised with the one or more insights having the associated resource identified as compliant. However, when the encryption is disabled, the one or more insights may report the resource to be not compliant. In an embodiment of the present disclosure, the one or more primary bots transmit the one or more insights 208 to the cloud management platform and performs one or more tasks to mitigate issues corresponding to the one or more insights 208 simultaneously.

The data validation module 314 is configured to determine one or more cloud infrastructure issues associated with the one or more user accounts by validating the obtained one or more insights 208 based on the set of predefined rules. In an embodiment of the present disclosure, the set of predefined rules are stored in the action registry 216 of the storage unit. In an exemplary embodiment of the present disclosure, the one or more cloud infrastructure issues include security issues, compliance issues, performance issues, management issues, privacy issues and the like.

The bot creation module 316 is configured to create the one or more customized bots 114 for the determined one or more cloud infrastructure issues based on the one or more user parameters 222 by using the rule engine based AI model 210. In an exemplary embodiment of the present disclosure, the one or more user parameters 222 include type of the one or more users, configuration of the one or more cloud infrastructure resources 102, type of the cloud infrastructure associated with the one or more users and the like. For example, the type of the one or more users may be tech organization, health organization and the like. In an exemplary embodiment of the present disclosure, the type of the cloud infrastructure may correspond to private clouds, public clouds, hybrid clouds, multi-clouds and the like. In creating the one or more customized bots 114 for the determined one or more cloud infrastructure issues based on the one or more user parameters 222 by using the rule engine based AI model 210, the bot creation module 316 obtains the one or more user parameters 222 corresponding to the one or more users and the cloud infrastructure. In an embodiment of the present disclosure, the one or more user parameters 222 are obtained from the one or more users. Further, the bot creation module 316 correlates the obtained one or more user parameters 222, validated one or more insights 208, the determined one or more cloud infrastructure issues, the one or more events and the one or more bot parameters by using the rule engine based AI model 210. The one or more events include the one or more security events and the one or more compliance events associated with the one or more user accounts. In an exemplary embodiment of the present disclosure, the one or more bot parameters include bot states, bot types, bot instances, launch scope of the bot instances and bot management functionalities corresponding to the plurality of customized bots that are created, composed or a combination thereof by the bot manager 112. In an exemplary embodiment of the present disclosure, the bot states may include active, de-active, standby and the like. The one or more bot parameters are stored in the bot registry 218 of the storage unit 306. In an exemplary of the present disclosure, the bot management functionalities include change configuration, control lifecycle, monitor bot insights and the like associated with the plurality of customized bots. Furthermore, the bot creation module 316 generates the customized bot configuration 224 for the cloud infrastructure based on result of correlation. The bot creation module 316 creates the one or more customized bots 114 for the determined one or more cloud infrastructure based on the generated customized bot configuration 224 by using the rule engine based AI model 210 via the bot manager 112.

The bot deploying module 318 is configured to deploy the created one or more customized bots 114 on the one or more cloud infrastructure resources 102.

The data receiver module 320 is configured to periodically receive the one or more bot parameters from the one or more customized bots deployed on the one or more cloud infrastructure resources 102. Further, the data receiver module 320 store the received one or more bot parameters in the bot registry 218 of the storage unit 306.

The data management module 320 is configured to manage the cloud infrastructure via the deployed one or more customized bots 114. In managing the cloud infrastructure via the deployed one or more customized bots, the data management module 320 predicts one or more activities associated with the one or more user accounts via the deployed one or more customized bots. Further, the data management module 320 predicts one or more behavior patterns of the one or more users via the deployed one or more customized bots. The data management module 320 performs one or more actions on the one or more cloud infrastructure resources 102 in the one or more user accounts via the one or more customized bots based on the determined one or more cloud infrastructure issues, the predicted one or more activities and the predicted one or more behavior patterns to resolve the one or more cloud infrastructure issues. In an exemplary embodiment of the present disclosure, the one or more actions may include one or more security actions, one or more compliance actions and the like.

In an embodiment of the present disclosure, when the one or more primary bots 110 are the one or more security bots, in managing the cloud infrastructure via the deployed one or more customized bots 114, the data management module 320 determines one or more security issues based on the generated one or more security insights and predefined security information by using the rule engine based AI model 210 via the one or more customized bots 114. Further, the data management module 320 notifies the one or more users of the determined one or more security issues via a notification interface. In an exemplary embodiment of the present disclosure, the plurality of security issues includes unauthorized access, configuration change events, state change events, resource or service health events and the like.

In an exemplary embodiment of the present disclosure, the notification interface may include chat, in-app notifications, email, Short Message Service (SMS), web interface and the like. The one or more users may perform manual actions to resolve the notified one or more security issues. Furthermore, the data management module 320 performs one or more security actions on the one or more cloud infrastructure resources 102 in the one or more user accounts via the one or more customized bots 114 to resolve the determined one or more security issues.

Further, when the one or more primary bots 110 are the one or more compliance bots, in managing the cloud infrastructure via the deployed one or more customized bots 114, the data management module 320 ascertains if the generated one or more compliance insights adhere to a pre-configured compliance rules via the one or more customized bots 114. In an exemplary embodiment of the present disclosure, the pre-configured compliance rules may include Service Organization Controls (SoC) compliance, Health Insurance Portability and Accountability Act (HIPAA) compliance or any custom appliance. The data management module 320 determines one or more compliance violations upon ascertaining that the one or more compliance insights do not adhere with the pre-configured compliance rules based on the generated one or more compliance insights and the pre-configured compliance rules by using the rule engine based AI model 210. Furthermore, the data management module 320 notifies the one or more users of the determined one or more compliance violations via the notification interface. In an exemplary embodiment of the present disclosure, the one or more compliance violations include violation of SoC compliance and HIPAA compliance The one or more users may perform manual actions to resolve the notified one or more compliance violations. The data management module 320 performs one or more compliance actions on the one or more cloud infrastructure resources 102 in the one or more user accounts via the one or more customized bots 114 to resolve the determined one or more compliance violations.

In an embodiment of the present disclosure, the one or more primary robots keep monitoring and tracking the one or more events corresponding to the one or more user accounts including one or more security events and the one or more compliance events, such that the one or more insights 208 may be updated based on the monitored and tracked one or more events. Further, the bot manager 112 updates the customized bot configuration 224 based on the updated one or more insights 208, such that the bot composer 220 may create one or more updated customized bots based on the updated customized bot configuration 224 by using the rule engine based AI model 210. The customized bot configuration 224 may also be updated by the one or more users by adding a set of user parameters. In an embodiment of the present disclosure, the bot registry 218 maintains the one or more bot parameters corresponding to the one or more updated customized bots. The bot manager 112 allows the one or more users to customize the bot configuration associated of the one or more primary bots by updating permission of the one or more primary bots to perform the one or more actions, by updating permission of the one or more primary bots to obtain or monitor signals associated with the one or more primary insights 208 and the like. In an embodiment of the present disclosure, the bot manager 112 is also responsible for keeping the one or more primary bots updated and presiding over its lifecycle, such as re-deployment, bot removal and the like.

In an embodiment of the present disclosure, the one or more events along with event details, such as one or more security events along with associated security state or one or more compliance events along with associated compliance state are used to generate infrastructure fingerprints. The generated infrastructure fingerprints are used to make predictions for the fingerprinted infrastructure. In an embodiment of the present disclosure, the fingerprint is a unique identifiable code representing a system, application or environment derived from a plurality of patterns without having any identifiable association with underlying user context.

In operation, the cloud management platform 104 dynamically fetches the one or more events including the one or more security events and the one or more compliance events, associated with the one or more user accounts from the one or more sources through the one or more primary bots 110. Further, the cloud management platform 104 generates the one or more insights 208 including the one or more security insights and the one or more compliance insights, associated with the one or more user accounts based on the fetched one or more events by using the rule engine based AI model 210 via the one or more primary bots 110. The cloud management platform 104 determines the one or more cloud infrastructure issues associated with the one or more user accounts by validating the generated one or more insights 208 based on the set of predefined rules. The cloud management platform 104 also creates the one or more customized bots 114 for the determined one or more cloud infrastructure issues based on the one or more user parameters 222 by using the rule engine based AI model 210. Furthermore, the cloud management platform 104 deploy the created one or more customized bots 114 on the one or more cloud infrastructure resources 102. The cloud management platform 104 manages the cloud infrastructure via the deployed one or more customized bots 114 by performing the one or more security actions and the one or more compliance actions.

Figure 4:
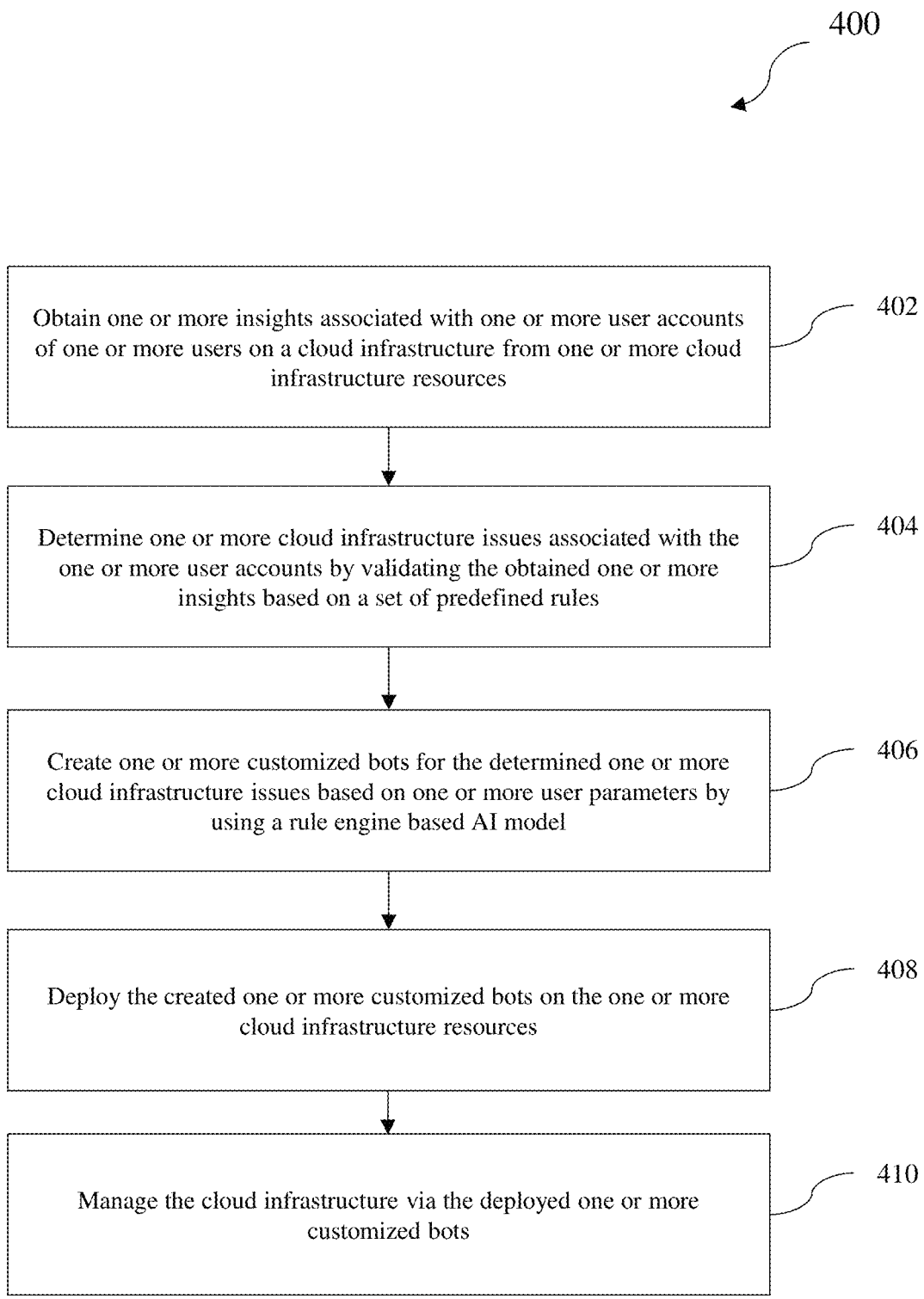
FIG. 4 is a process flow diagram illustrating an exemplary method for facilitating management of the cloud infrastructure by using the smart bots, in accordance with an embodiment of the present disclosure.

FIG. 4 is a process flow diagram illustrating an exemplary method 400 for facilitating management of cloud infrastructure by using smart bots, in accordance with an embodiment of the present disclosure. In an embodiment of the present disclosure, the method is performed by a Software as a Service (SaaS) platform. At step 402, one or more insights 208 associated with one or more user accounts of one or more users on a cloud infrastructure are obtained from one or more cloud infrastructure resources 102. In an exemplary embodiment of the present disclosure, the one or more cloud infrastructure resources 102 may include one or more cloud computing devices. In an exemplary embodiment of the present disclosure, the one or more cloud computing devices may include Central Processing Unit (vCPU), Graphical Processing Unit (GPU), virtual network devices or interfaces attached to virtual or physical storage devices and the like. Further, the one or more insights 208 may include one or more security insights, one or more compliance insights and the like. In an embodiment of the present disclosure, the one or more insights 208 associated with the one or more user accounts are obtained through one or more primary bots 110. The one or more primary bots are deployed on the one or more cloud infrastructure resources 102. In an embodiment of the present disclosure, one or more primary bots autonomously plugs into an events stream from the one or more user accounts and obtains the one or more insights 208. The one or more primary bots operate outside of the cloud management platform in the one or more user accounts based on smart rules. In an embodiment of the present disclosure, the one or more primary bots may filter noise from signals associated with the one or more insights 208 by analyzing the event stream in its deployed environment. In an exemplary embodiment of the present disclosure, the one or more primary bots 110 include one or more security bots, one or more compliance bots and the like. In an embodiment of the present disclosure, the one or more primary bots 110 are autonomous and intelligent software entities which may be deployed in one or more boundaries, such as organization, department, application, cloud account/subscription, region and the like. In another embodiment of the present disclosure, the one or more primary bots 110 are lambda function configured to receive events to monitor the one or more user accounts. The one or more primary bots 110 may not be associated with the one or more cloud infrastructure resources 102. In obtaining the one or more insights associated with one or more user accounts of the one or more users on the cloud infrastructure from the cloud computing devices, the method 400 includes monitoring the one or more user accounts associated with the one or more users by using the one or more primary bots 110. Further, the method 400 includes obtaining the one or more insights associated with the one or more user accounts based on result of monitoring by using the rule engine based AI model via the one or more primary bots 110.

Further, when the one or more primary bots 110 are the one or more security bots, in obtaining the one or more insights 208 associated with the one or more user accounts of the one or more users on the cloud infrastructure from the one or more cloud infrastructure resources 102, the method 400 includes dynamically fetching one or more security events associated with the one or more user accounts from one or more sources through the one or more security bots by continuously monitoring one or more security aspects of the one or more user accounts. In an exemplary embodiment of the present disclosure, the one or more security aspects include relevant events, configuration changes, API trail activities within the one or more user accounts and the like. In an exemplary embodiment of the present disclosure, the one or more sources include cloud services 202, infrastructure events 204, alerts 206 or a combination thereof. The method 400 includes generating the one or more security insights associated with the one or more user accounts on the cloud infrastructure based on the fetched one or more security events by using a rule engine based Artificial Intelligence (AI) model 210 via the one or more security bots.

Furthermore, when the one or more primary bots 110 are the one or more compliance bots, in obtaining the one or more insights 208 associated with the one or more user accounts of the one or more users on the cloud infrastructure from the one or more cloud infrastructure resources 102, method 400 includes dynamically fetching one or more compliance events associated with the one or more user accounts from the one or more sources through the one or more compliance bots by continuously monitoring one or more compliance aspects of the one or more user accounts. In an exemplary embodiment of the present disclosure, the one or more compliance aspects include configuration, changes to infrastructure in the one or more user accounts and the like. The method 400 includes generating the one or more compliance insights associated with the one or more user accounts on the cloud infrastructure based on the fetched one or more compliance events by using the rule engine based AI model 210 via the one or more compliance bots. In an embodiment of the present disclosure, the one or more primary bots transmit the one or more insights 208 to the cloud management platform and performs one or more tasks to mitigate issues corresponding to the one or more insights 208 simultaneously.

At step 404 one or more cloud infrastructure issues associated with the one or more user accounts are determined by validating the obtained one or more insights 208 based on a set of predefined rules. In an embodiment of the present disclosure, the set of predefined rules are stored in an action registry 216 of a storage unit. In an exemplary embodiment of the present disclosure, the one or more cloud infrastructure issues include security issues, compliance issues, performance issues, management issues, privacy issues and the like.

At step 406, one or more customized bots 114 are created for the determined one or more cloud infrastructure issues based on one or more user parameters 222 by using the rule engine based AI model 210. In an exemplary embodiment of the present disclosure, the one or more user parameters 222 include type of the one or more users, configuration of the one or more cloud infrastructure resources 102, type of the cloud infrastructure associated with the one or more users and the like. For example, the type of the one or more users may be tech organization, health organization and the like. In an exemplary embodiment of the present disclosure, the type of the cloud infrastructure may correspond to private clouds, public clouds, hybrid clouds, multi-clouds and the like. In creating the one or more customized bots 114 for the determined one or more cloud infrastructure issues based on the one or more user parameters 222 by using the rule engine based AI model 210, the method 400 includes obtaining the one or more user parameters 222 corresponding to the one or more users and the cloud infrastructure. In an embodiment of the present disclosure, the one or more user parameters 222 are obtained from the one or more users. Further, the method 400 includes correlating the obtained one or more user parameters 222, validated one or more insights 208, the determined one or more cloud infrastructure issues, the one or more events and one or more bot parameters by using the rule engine based AI model 210. The one or more events include the one or more security events and the one or more compliance events associated with the one or more user accounts. In an exemplary embodiment of the present disclosure, the one or more bot parameters include bot states, bot types, bot instances, launch scope of the bot instances and bot management functionalities corresponding to the plurality of customized bots that are created, composed or a combination thereof by a bot manager 112. In an exemplary embodiment of the present disclosure, the bot states may include active, de-active, standby and the like. The one or more bot parameters are stored in bot registry 218 of a storage unit 306. In an exemplary of the present disclosure, the bot management functionalities include change configuration, control lifecycle, monitor bot insights and the like associated with the plurality of customized bots. Furthermore, the method 400 includes generating the customized bot configuration 224 for the cloud infrastructure based on result of correlation. The method 400 includes creating the one or more customized bots 114 for the determined one or more cloud infrastructure issues based on the generated customized bot configuration 224 by using the rule engine based AI model 210 via the bot manager 112.

At step 408, the created one or more customized bots 114 are deployed on the one or more cloud infrastructure resources 102. In an embodiment of the present disclosure, the method 400 includes periodically receiving the one or more bot parameters from the one or more customized bots deployed on the one or more cloud infrastructure resources 102. Further, the method includes storing the received one or more bot parameters in the bot registry 218 of the storage unit 306.

At step 410, the cloud infrastructure is managed via the deployed one or more customized bots 114. In managing the cloud infrastructure via the deployed one or more customized bots, the method 400 includes predicting one or more activities associated with the one or more user accounts via the deployed one or more customized bots. Further, the method 400 includes predicting one or more behavior patterns of the one or more users via the deployed one or more customized bots. The method 400 includes performing one or more actions on the one or more cloud infrastructure resources in the one or more user accounts via the one or more customized bots based on the determined one or more cloud infrastructure issues, the predicted one or more activities and the predicted one or more behavior patterns to resolve the one or more cloud infrastructure issues. In an exemplary embodiment of the present disclosure, the one or more actions may include one or more security actions, one or more compliance actions and the like.

In an embodiment of the present disclosure, when the one or more primary bots 110 are the one or more security bots, in managing the cloud infrastructure via the deployed one or more customized bots 114, the method 400 includes determining one or more security issues based on the generated one or more security insights and predefined security information by using the rule engine based AI model 210 via the one or more customized bots 114. Further, the method 400 includes notifying the one or more users of the determined one or more security issues via a notification interface. In an exemplary embodiment of the present disclosure, the plurality of security issues includes unauthorized access, configuration change events, state change events, resource or service health events and the like. In an exemplary embodiment of the present disclosure, the notification interface may include chat, in-app notifications, email, Short Message Service (SMS), web interface and the like. The one or more users may perform manual actions to resolve the notified one or more security issues. Furthermore, the method 400 includes performing one or more security actions on the one or more cloud infrastructure resources 102 via the one or more customized bots 114 to resolve the determined one or more security issues.

Further, when the one or more primary bots 110 are the one or more compliance bots, in managing the cloud infrastructure via the deployed one or more customized bots 114, the method 400 includes ascertaining if the generated one or more compliance insights adhere to a pre-configured compliance rules via the one or more customized bots 114. In an exemplary embodiment of the present disclosure, the pre-configured compliance rules may include Service Organization Controls (SoC) compliance, Health Insurance Portability and Accountability Act (HIPAA) compliance or any custom appliance. The method 400 includes determining one or more compliance violations upon ascertaining that the one or more compliance insights do not adhere with the pre-configured compliance rules based on the generated one or more compliance insights and the pre-configured compliance rules by using the rule engine based AI model 210. Furthermore, the method 400 includes notifying the one or more users of the determined one or more compliance violations via the notification interface. In an exemplary embodiment of the present disclosure, the one or more compliance violations include violation of SoC compliance and HIPAA compliance. The one or more users may perform manual actions to resolve the notified one or more compliance violations. The method 400 includes performing one or more compliance actions on the cloud computing devices 102 in the one or more user accounts via the one or more customized bots 114 to resolve the determined one or more compliance violations.

In an embodiment of the present disclosure, the one or more primary robots keep monitoring and tracking the one or more events corresponding to the one or more user accounts including one or more security events and the one or more compliance events, such that the one or more insights 208 may be updated based on the monitored and tracked one or more events. Further, the bot manager 112 updates the customized bot configuration 224 based on the updated one or more insights 208, such that bot composer 220 may create one or more updated customized bots based on the updated customized bot configuration 224 by using the rule engine based AI model 210. The customized bot configuration 224 may also be updated by the one or more users by adding a set of user parameters. In an embodiment of the present disclosure, the bot registry 218 maintains the one or more bot parameters corresponding to the one or more updated customized bots. The bot manager 112 allows the one or more users to customize the bot configuration associated of the one or more primary bots by updating permission of the one or more primary bots to perform the one or more actions, by updating permission of the one or more primary bots to obtain or monitor signals associated with the one or more primary insights 208 and the like. In an embodiment of the present disclosure, the bot manager 112 is also responsible for keeping the one or more primary bots updated and presiding over its lifecycle, such as re-deployment, bot removal and the like.

In an embodiment of the present disclosure, the one or more events along with event details, such as one or more security events along with associated security state or one or more compliance events along with associated compliance state are used to generate infrastructure fingerprints. The generated infrastructure fingerprints are used to make predictions for the fingerprinted infrastructure. In an embodiment of the present disclosure, the fingerprint is a unique identifiable code representing a system, application or environment derived from a plurality of patterns without having any identifiable association with underlying user context.

The method 400 may be implemented in any suitable hardware, software, firmware, or combination thereof.

Figure 5A:
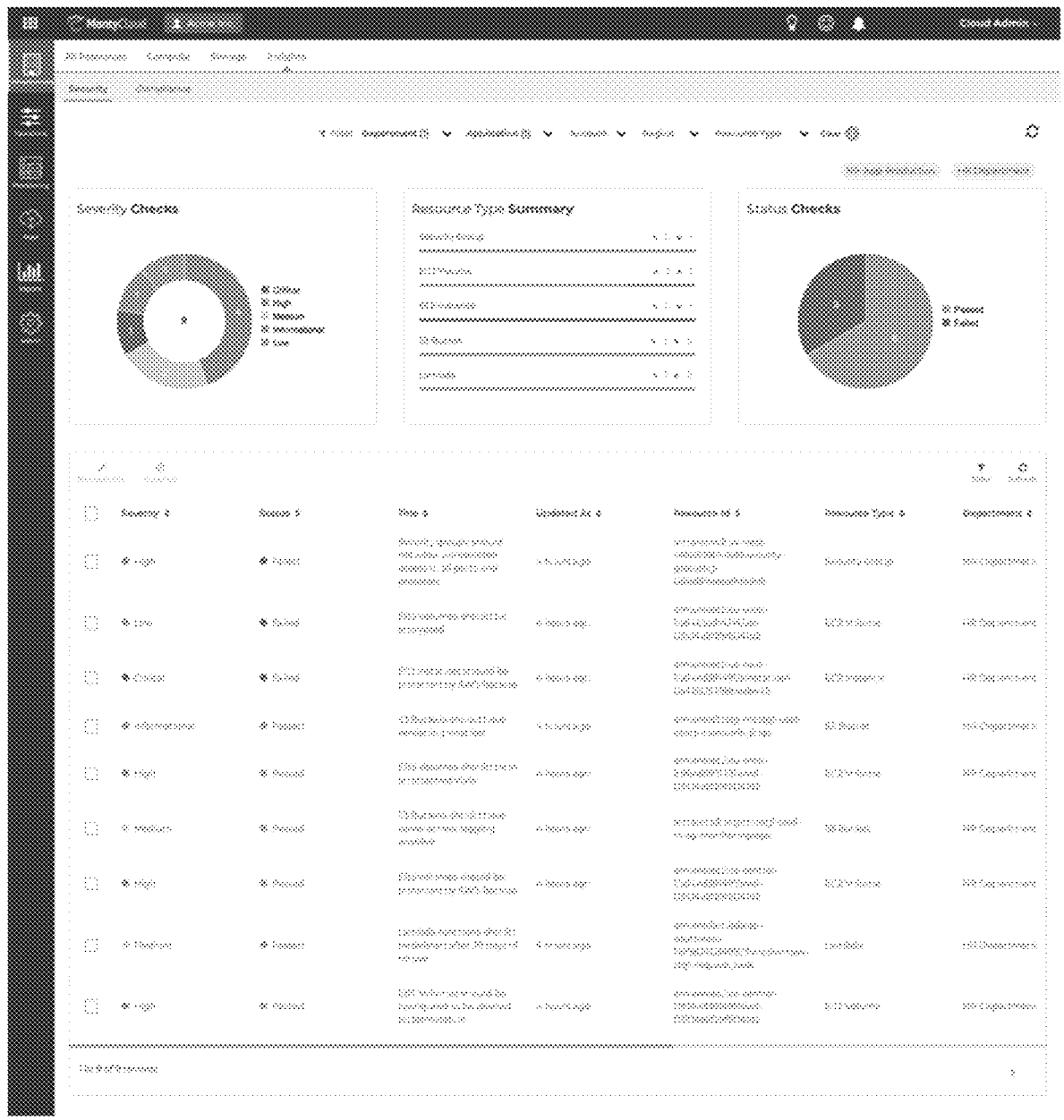
FIG. 5A is a graphical user interface screen illustrating an exemplary security bot dashboard, in accordance with an embodiment of the present disclosure.

FIG. 5A is a graphical user interface screen illustrating an exemplary security bot dashboard, in accordance with an embodiment of the present disclosure. The security bot dashboard displays the one or more security insights. Further, the security bot dashboard displays severity checks, resource type summary and status checks as shown in FIG. 5A. In an exemplary embodiment of the present disclosure, the severity checks may be critical, high, medium, informational, low and the like. The status checks may be passed or failed. The security bot dashboard also displays a list of the one or more security events including severity, status, title, updated at, resource ID, resource type and department of each of the one or more security events.

Figure 5B:
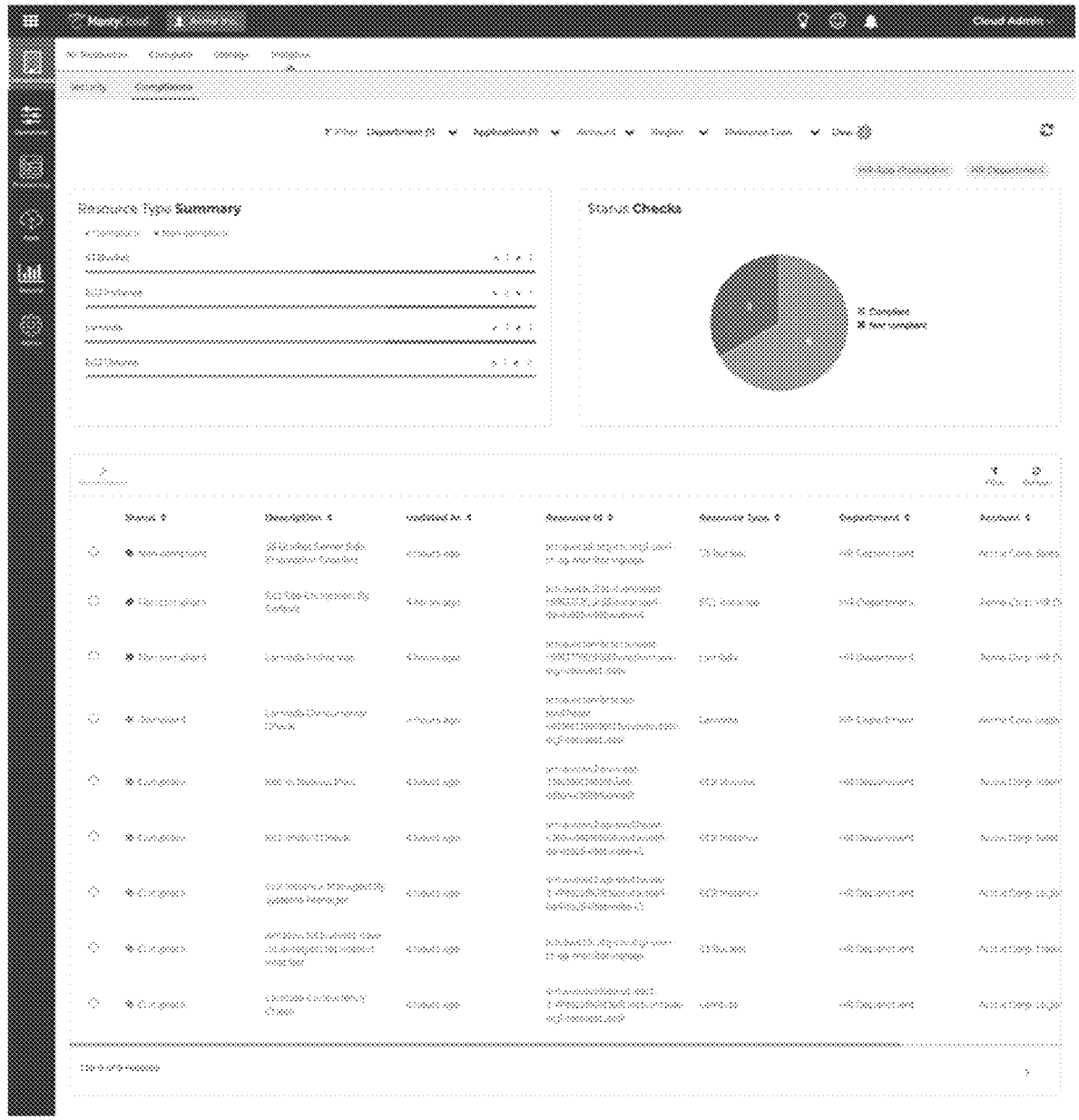
FIG. 5B is a graphical user interface screen illustrating an exemplary compliance bot dashboard, in accordance with an embodiment of the present disclosure.

FIG. 5B is a graphical user interface screen illustrating an exemplary compliance bot dashboard, in accordance with an embodiment of the present disclosure. The compliance bot dashboard displays the one or more compliance insights. Further, the compliance bot dashboard displays resource type summary and status checks as shown in FIG. 5B. In an exemplary embodiment of the present disclosure, the status checks may be compliant or non-compliant. The compliance bot dashboard also displays a list of the one or more compliance events including status, description, updated at, resource ID, resource type, department and account of each of the one or more security events.

Thus, various embodiments of the present cloud management platform 104 provide a solution to facilitate management of the cloud infrastructure by using the smart bots. Since, the cloud management platform 104 automatically performs the one or more security actions and the one or more compliance actions on the one or more cloud infrastructure resources 102 in the one or more user accounts to manage the cloud infrastructure via the one or more customized bots 114, the cloud management platform 104 saves time and efforts of the one or more users. In an embodiment of the present disclosure, the cloud management platform 104 is a SaaS platform that enables creation, deployment and management of the one or more customized bots 114 for managing the cloud infrastructure of the one or more users. The cloud management platform 104 provides platform extensibility by allowing the one or more users to compose and deploy the one or more customized bots 114 based on the one or more user parameters 222 to manage their cloud infrastructure. Thus, the one or more customized bots 114 are accurate and efficient in terms of managing the cloud infrastructure. The cloud management platform 104 enables self-service management of smart bots as the one or more users may easily create the one or more customized bots 114, edit configuration of the one or more customized bots 114, deploy and manage lifecycle of the one or more customized bots 114. Furthermore, the cloud management platform 104 allows deployment of the one or more primary bots and the one or more customized bots 114 on restricted environments. Thus, the one or more users may easily deploy the one or more primary bots and the one or more customized bots 114 to cloud environments that are restricted and thus not under directly onboarded to the cloud management platform 104. In an embodiment of the present disclosure, the one or more primary bots 110 and the one or more customized bots 114 are autonomous and intelligent entities that can be deployed to boundaries, such as organization, department, application, cloud account-regions and the like to extend reach and functionality of the cloud management platform 104. Further, the cloud management platform 104 provides a framework to create, customize and manage the one or more customized bots 114 through its bot composer 220. The cloud management platform 104 allows the one or more users to create the one or more customized bots 114 without using any codes, such that the one or more customized bots 114 may fulfill all requirements of the one or more users. The cloud management platform 104 deploys the one or more customized bots 114 on the one or more cloud infrastructure resources 102 and manages entire lifecycle of the deployed one or more customized bots 114. In an embodiment of the present disclosure, the cloud management platform 104 provides a whole set of common cloud management functionalities as platform tasks. The platform tasks are customizable and schedulable units of work that otherwise will require an engineer to run multiple operations/scripts to perform. In an exemplary embodiment of the present disclosure, the platform tasks may include start or stop machine instances, apply patch to managed compute instances, manage storage and backups, run custom scripts on machines and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a random-access memory (RAM), virtual or physical hard disks, object store, such as S3 or blob store and the like.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 308 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A cloud management platform for facilitating management of cloud infrastructure by using smart bots, the cloud management platform comprising:
   a plurality of virtual cloud appliances; and
   a memory coupled to the plurality of virtual cloud appliances, wherein the memory comprises a plurality of modules in the form of programmable instructions executable by the plurality of virtual cloud appliances, wherein the plurality of modules comprises:
      a data obtaining module configured to obtain one or more insights associated with one or more user accounts of one or more users on a cloud infrastructure from one or more cloud infrastructure resources;
      a data validation module configured to determine one or more cloud infrastructure issues associated with the one or more user accounts by validating the obtained one or more insights based on a set of predefined rules;
      a bot creation module configured to create one or more customized bots for the determined one or more cloud infrastructure issues based on one or more user parameters by using a rule engine based Artificial Intelligence (AI) model;
      a bot deploying module configured to deploy the created one or more customized bots on the one or more cloud infrastructure resources; and
      a data management module configured to manage the cloud infrastructure via the deployed one or more customized bots.

2. The cloud management platform of claim 1, wherein the one or more user parameters comprise: type of the one or more users, configuration of the one or more cloud infrastructure resources and type of the cloud infrastructure associated with the one or more users.

3. The cloud management platform of claim 1, wherein in obtaining the one or more insights associated with one or more user accounts of the one or more users on the cloud infrastructure from the one or more cloud infrastructure resources, the data obtaining module is configured to:
   monitor the one or more user accounts associated with the one or more users; and
   obtain the one or more insights associated with the one or more user accounts based on result of monitoring by using the rule engine based AI model.

4. The cloud management platform of claim 1, wherein in creating the one or more customized bots for the determined one or more cloud infrastructure issues based on the one or more user parameters by using the rule engine based AI model, the bot creation module is configured to:
   obtain the one or more user parameters corresponding to the one or more users and the cloud infrastructure;
   correlate the obtained one or more user parameters, determined one or more issues, the validated one or more insights, one or more events and one or more bot parameters by using the rule engine based AI model, wherein the one or more events comprise: one or more security events and one or more compliance events associated with the one or more user accounts;
   generate a customized bot configuration for the cloud infrastructure based on result of correlation; and
   create the one or more customized bots for the determined one or more cloud infrastructure issues based on the generated customized bot configuration by using the rule engine based AI model via the bot manager.

5. The cloud management platform of claim 1, wherein the one or more insights associated with the one or more user accounts are obtained through one or more primary bots wherein the one or more primary bots comprise: one or more security bots and one or more compliance bots.

6. The cloud management platform of claim 1, further comprises a data receiver module configured to:
   periodically receive one or more bot parameters from the one or more customized bots deployed on the one or more cloud infrastructure resources, Iwherein the one or more bot parameters comprise: bot states, bot types, bot instances, launch scope of the bot instances and bot management functionalities; and store the received one or more bot parameters in a storage unit.

7. The cloud management platform of claim 1, wherein in managing the cloud infrastructure via the deployed one or more customized bots, the data management module is configured to perform at least one of:
   predict one or more activities associated with the one or more user accounts via the deployed one or more customized bots;
   predict one or more behavior patterns of the one or more users via the deployed one or more customized bots; and
   perform one or more actions on the one or more cloud infrastructure resources via the one or more customized bots based on the determined one or more cloud infrastructure issues, the predicted one or more activities and the predicted one or more behavior patterns to resolve the one or more cloud infrastructure issues.

8. The cloud management platform of claim 5, wherein when the one or more primary bots are the one or more security bots, in obtaining the one or more insights associated with the one or more user accounts of the one or more users on the cloud infrastructure from the one or more cloud infrastructure resources, the data obtaining module is configured to:
dynamically fetch one or more security events associated with the one or more user accounts from one or more sources through the one or more security bots by continuously monitoring one or more security aspects of the one or more user accounts and wherein the one or more security aspects comprise: relevant events, configuration changes and API trail activities within the one or more user accounts; and
generate one or more security insights associated with the one or more user accounts on the cloud infrastructure based on the fetched one or more security events by using the rule engine based AI model via the one or more security bots.

9. The cloud management platform of claim 8, wherein when the one or more primary bots are the one or more security bots, in managing the cloud infrastructure via the deployed one or more customized bots, the data management module is configured to:
determine one or more security issues based on the generated one or more security insights and predefined security information by using the rule engine based AI model via the one or more customized bots;
notify the one or more users of the determined one or more security issues via a notification interface, wherein the notification interface comprises: chat, in-app notifications, email, Short Message Service (SMS) and web interface; and
perform one or more security actions on the one or more cloud infrastructure resources via the one or more customized bots to resolve the determined one or more security issues.

10. The cloud management platform of claim 8, wherein the one or more sources comprise at least one of: cloud services, infrastructure events and alerts.

11. The cloud management platform of claim 5, wherein when the one or more primary bots are the one or more compliance bots, in obtaining the one or more insights associated with the one or more user accounts of the one or more users on the cloud infrastructure from the one or more cloud infrastructure resources, the data obtaining module is configured to:
dynamically fetch one or more compliance events associated with the one or more user accounts from one or more sources through the one or more compliance bots by continuously monitoring one or more compliance aspects of the one or more user accounts, wherein the one or more compliance aspects comprise: configuration and changes to infrastructure in the one or more user accounts; and
generate one or more compliance insights associated with the one or more user accounts on the cloud infrastructure based on the fetched one or more compliance events by using the rule engine based AI model via the one or more compliance bots.

12. The cloud management platform of claim 11, wherein when the one or more primary bots are the one or more compliance bots, in managing the cloud infrastructure via the deployed one or more customized bots, the data management module is configured to:
ascertain if the generated one or more compliance insights adhere to a pre-configured compliance rules via the one or more customized bots;
determine one or more compliance violations upon ascertaining that the one or more compliance insights do not adhere with the pre-configured compliance rules based on the generated one or more compliance insights and the pre-configured compliance rules by using the rule engine based AI model;
notify the one or more users of the determined one or more compliance violations via a notification interface; and
perform one or more compliance actions on the one or more cloud infrastructure resources via the one or more customized bots to resolve the determined one or more compliance violations.

13. A method for facilitating management of cloud infrastructure by using smart bots, the method comprising:
obtaining, by a plurality of virtual cloud appliances, one or more insights associated with one or more user accounts of one or more users on a cloud infrastructure from one or more cloud infrastructure resources;
determining, by the plurality of virtual cloud appliances, one or more cloud infrastructure issues associated with the one or more user accounts by validating the obtained one or more insights based on a set of predefined rules;
creating, by the plurality of virtual cloud appliances, one or more customized bots for the determined one or more cloud infrastructure issues based on one or more user parameters by using a rule engine based Artificial Intelligence (AI) model;
deploying, by the plurality of virtual cloud appliances, the created one or more customized bots on the one or more cloud infrastructure resources; and
managing, by the plurality of virtual cloud appliances, the cloud infrastructure via the deployed one or more customized bots.

14. The method of claim 13, wherein the one or more user parameters comprise: type of the one or more users, configuration of the one or more cloud infrastructure resources and type of the cloud infrastructure associated with the one or more users.

15. The method of claim 13, wherein obtaining the one or more insights associated with one or more user accounts of the one or more users on the cloud infrastructure from the cloud computing devices comprises:
monitoring the one or more user accounts associated with the one or more users; and
obtaining the one or more insights associated with the one or more user accounts based on result of monitoring by using the rule engine based AI model.

16. The method of claim 13, wherein in creating the one or more customized bots for the determined one or more cloud infrastructure issues based on the one or more user parameters by using the rule engine based AI model comprises:
obtaining the one or more user parameters corresponding to the one or more users and the cloud infrastructure;
correlating the obtained one or more user parameters, determined one or more cloud infrastructure issues, the validated one or more insights, one or more events and one or more bot parameters by using the rule engine based AI model, wherein the one or more events comprise:
one or more security events and one or more compliance events associated with the one or more user accounts;
generating a customized bot configuration for the cloud infrastructure based on result of correlation; and creating the one or more customized bots for the determined one or more cloud infrastructure issues based on the generated customized bot configuration by using the rule engine based AI model via the bot manager.

17. The method of claim 13, wherein the one or more insights associated with the one or more user accounts are obtained through one or more primary bots, wherein the one or more primary bots comprise: one or more security bots and one or more compliance bots.

18. The method of claim 13, further comprises:
periodically receiving one or more bot parameters from the one or more customized bots deployed on the one or more cloud infrastructure resources, wherein the one or more bot parameters comprise: bot states, bot types, bot instances, launch scope of the bot instances and bot management functionalities; and
storing the received one or more bot parameters in a storage unit.

19. The method of claim 13, wherein managing the cloud infrastructure via the deployed one or more customized bots comprises at least one of:
predicting one or more activities associated with the one or more user accounts via the deployed one or more customized bots;
predicting one or more behavior patterns of the one or more users via the deployed one or more customized bots; and
performing one or more actions on the one or more cloud infrastructure resources via the one or more customized bots based on the determined one or more cloud infrastructure issues, the predicted one or more activities and the predicted one or more behavior patterns to resolve the one or more cloud infrastructure issues.

20. The method of claim 17, wherein when the one or more primary bots are the one or more security bots, obtaining the one or more insights associated with the one or more user accounts of the one or more users on the cloud infrastructure from the one or more cloud infrastructure resources comprises:
dynamically fetching one or more security events associated with the one or more user accounts from one or more sources through the one or more security bots by continuously monitoring one or more security aspects of the one or more user accounts and wherein the one or more security aspects comprise: relevant events, configuration changes and API trail activities within the one or more user accounts; and
generating one or more security insights associated with the one or more user accounts on the cloud infrastructure based on the fetched one or more security events by using the rule engine based AI model via the one or more security bots.

21. The method of claim 16, wherein when the one or more primary bots are the one or more security bots, managing the cloud infrastructure via the deployed one or more customized bots comprises:
determining one or more security issues based on the generated one or more security insights and predefined security information by using the rule engine based AI model via the one or more customized bots;
notifying the one or more users of the determined one or more security issues via a notification interface, wherein the notification interface comprises: chat, in-app notifications, email, Short Message Service (SMS) and web interface; and
performing one or more security actions on the one or more cloud infrastructure resources via the one or more customized bots to resolve the determined one or more security issues.

22. The method of claim 20, wherein the one or more sources comprise at least one of: cloud services, infrastructure events and alerts.

23. The method of claim 17, wherein when the one or more primary bots are the one or more compliance bots, obtaining the one or more insights associated with the one or more user accounts of the one or more users on the cloud infrastructure from the one or more cloud infrastructure resources comprises:
dynamically fetching one or more compliance events associated with the one or more user accounts from one or more sources through the one or more compliance bots by continuously monitoring one or more compliance aspects of the one or more user accounts, wherein the one or more compliance aspects comprise: configuration and changes to infrastructure in the one or more user accounts; and
generating one or more compliance insights associated with the one or more user accounts on the cloud infrastructure based on the fetched one or more compliance events by using the rule engine based AI model via the one or more compliance bots.

24. The method of claim 23, wherein when the one or more primary bots are the one or more compliance bots, managing the cloud infrastructure via the deployed one or more customized bots comprises:
ascertaining if the generated one or more compliance insights adhere to a pre-configured compliance rules via the one or more customized bots;
determining one or more compliance violations upon ascertaining that the one or more compliance insights do not adhere with the pre-configured compliance rules based on the generated one or more compliance insights and the pre-configured compliance rules by using the rule engine based AI model;
notifying the one or more users of the determined one or more compliance violations via a notification interface; and
performing one or more compliance actions on the one or more cloud infrastructure resources via the one or more customized bots to resolve the determined one or more compliance violations.

* * * * *